US010578880B2

(12) United States Patent
Rider et al.

(10) Patent No.: US 10,578,880 B2
(45) Date of Patent: Mar. 3, 2020

(54) AUGMENTING REALITY VIA ANTENNA AND INTERACTION PROFILE

(71) Applicant: Intel Corporation, Santa Clara, CA (US)

(72) Inventors: Tomer Rider, Naahryia (IL); Ron Ferens, Ramat Hasharon (IL); Amit Moran, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 709 days.

(21) Appl. No.: 15/188,633

(22) Filed: Jun. 21, 2016

(65) Prior Publication Data
US 2017/0365231 A1 Dec. 21, 2017

(51) Int. Cl.
G06T 19/00 (2011.01)
G02B 27/01 (2006.01)
G06F 3/147 (2006.01)

(52) U.S. Cl.
CPC ......... G02B 27/0179 (2013.01); G06F 3/147 (2013.01); G06T 19/006 (2013.01); G09G 2340/125 (2013.01); G09G 2354/00 (2013.01); G09G 2370/16 (2013.01); G09G 2380/04 (2013.01)

(58) Field of Classification Search
None
See application file for complete search history.

(56) References Cited

U.S. PATENT DOCUMENTS

| 9,015,245 B1* | 4/2015 | Lee et al. .......... H04L 29/06476 709/203 |
| 9,092,898 B1 | 7/2015 | Fraccaroli et al. |
| 9,466,143 B1* | 10/2016 | Walvoord ............... G06T 15/00 |
| 2009/0033588 A1* | 2/2009 | Kajita .................. G02B 27/017 345/2.3 |
| 2011/0181497 A1 | 7/2011 | Ravi |
| 2012/0320088 A1* | 12/2012 | Ihara .................. G05B 23/0216 345/629 |
| 2013/0044130 A1* | 2/2013 | Geisner .................... G09G 5/00 345/633 |
| 2013/0120224 A1* | 5/2013 | Cajigas .................... G09G 5/00 345/8 |
| 2013/0155058 A1* | 6/2013 | Golparvar-Fard .... G06T 19/006 345/419 |
| 2014/0139551 A1 | 5/2014 | McCulloch et al. |
| 2015/0302650 A1* | 10/2015 | Abdelmoati ............ G06F 3/041 345/633 |

(Continued)

FOREIGN PATENT DOCUMENTS

WO WO2014066580 A2 5/2014

OTHER PUBLICATIONS

Suzanne, "3 Guidelines for Choosing a Passive UHF RFID Antenna", Sep. 29, 2014, URL: https://blog.atlasrfidstore.com/choose-right-rfid-antenna.*

(Continued)

Primary Examiner — David H Chu
(74) Attorney, Agent, or Firm — Schwabe, Williamson & Wyatt, P.C.

(57) ABSTRACT

With a device comprising a directional antenna, obtain an interaction profile for an augmentable object and augment a sensory experience of the augmentable object according to the interaction profile.

12 Claims, 6 Drawing Sheets

(56) References Cited

U.S. PATENT DOCUMENTS

| | | | | |
|---|---|---|---|---|
| 2016/0005233 | A1* | 1/2016 | Fraccaroli | G02B 27/0172 |
| | | | | 345/633 |
| 2016/0019721 | A1* | 1/2016 | Bare | G01S 5/163 |
| | | | | 345/633 |
| 2016/0157938 | A1* | 6/2016 | Breisacher | A61B 34/20 |
| | | | | 703/11 |
| 2016/0379414 | A1* | 12/2016 | Brown | G06F 3/04842 |
| | | | | 345/633 |
| 2017/0135655 | A1* | 5/2017 | Wang | A61B 6/14 |
| 2017/0322119 | A1* | 11/2017 | Da Silva | G01M 99/00 |
| 2017/0352187 | A1* | 12/2017 | Haines | G06K 9/00671 |

OTHER PUBLICATIONS

Fluid Interfaces, "Smarter Objects, Fluid Interfaces Group, MIT Media Lab", May 9, 2013, URL: https://www.youtube.com/watch?v=NqcnDxzHwAs.*

Suzanne, "3 Guidelines for Choosing a Passive UHF RFID Antenna", Sep. 29, 2014, URL: https://blog.atlasrfidstore.com/choose-right-rfid-antenna (Year: 2014).*

Fluid Interfaces, "Smarter Objects, Fluid Interfaces Group, MIT Media Lab", May 9, 2013, URL: https://www.youtube.com/watch?v=NqcnDxzHwAs (Year: 2013).*

International Search Report and Written Opinion dated Aug. 8, 2017 for International Application No. PCT/US2017/031794, 16 pages.

Smarter Objects, http://fluid.media.mit.edu/projects/smarter-objects, Nov. 4, 2016, 6 pages.

MIT Smarter Objects Augmented Reality User Interface, https://www.youtube.comiwatch?v=UA_HZVmmY84, Nov. 4, 2016, 3 pages.

\* cited by examiner

AUGMENTING REALITY VIA ANTENNA AND INTERACTION PROFILE

TECHNICAL FIELD

The present disclosure relates to the field of computing. More particularly, the present disclosure relates to a method, apparatus, and system to augment reality using an antenna and an interaction profile.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

The "Internet-of-Things", aka "IoT" has seen significant growth. In general, IoT enhances electronic devices and physical objects with sensors, such as thermostats, cameras and the like, and connectivity, such as Wi-Fi, BLUETOOTH® and the like. This enables IoT devices to exhibit more complex behavior. For example, digital sensors can now monitor the room's temperature and user feedback and make sure the temperature follows the user preferences, taking into account environmental parameters and time of the day. Another example is found in Smart TVs that can sense proximate mobile devices and enable automatic connection to allow sharing.

Another area seeing growth is augmented reality, "AR" and virtual reality ("VR"). AR augments a physical object by presenting virtual content, such as audio and video, to extend and enhanced the user experience of the physical object. AR presentations can be made using mobile computer devices, such as phones and tablets, as well as with optical head-mounted displays ("OHMD") which involve a see-through display such as GOOGLE GLASS®. AR is distinguished from VR, which replaces the real world with a simulated world. VR is typically provided via virtual reality headsets which obscure a user's vision (though which may also use a camera to allow the user to see a digital rendering of the user's surroundings), such as OCULUS RIFT®.

For existing AR presentations, the user has to explicitly connect to the IoT device or be in an area which has been mapped and associated with an AR experience. For example, some IoT devices may require that the user install a custom application on a mobile device or use a web-based service in order to access the AR enhancements to the IoT device. The user must actively initiate the AR interaction and figure out how to operate the IoT device. An example of the mapping case can be found in mobile phone apps which present restaurant data while walking or which present star or mountain names, all based on the location and orientation of the mobile phone relative to the mapped location of restaurants, stars, and mountains.

However, as more IoT devices enter our environment, mapping IoT devices and/or requiring explicit connection are substantial problems.

BRIEF DESCRIPTION OF THE DRAWINGS

Embodiments of the present disclosure may overcome some or all of the above noted limitations. Techniques, apparatuses, and systems will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
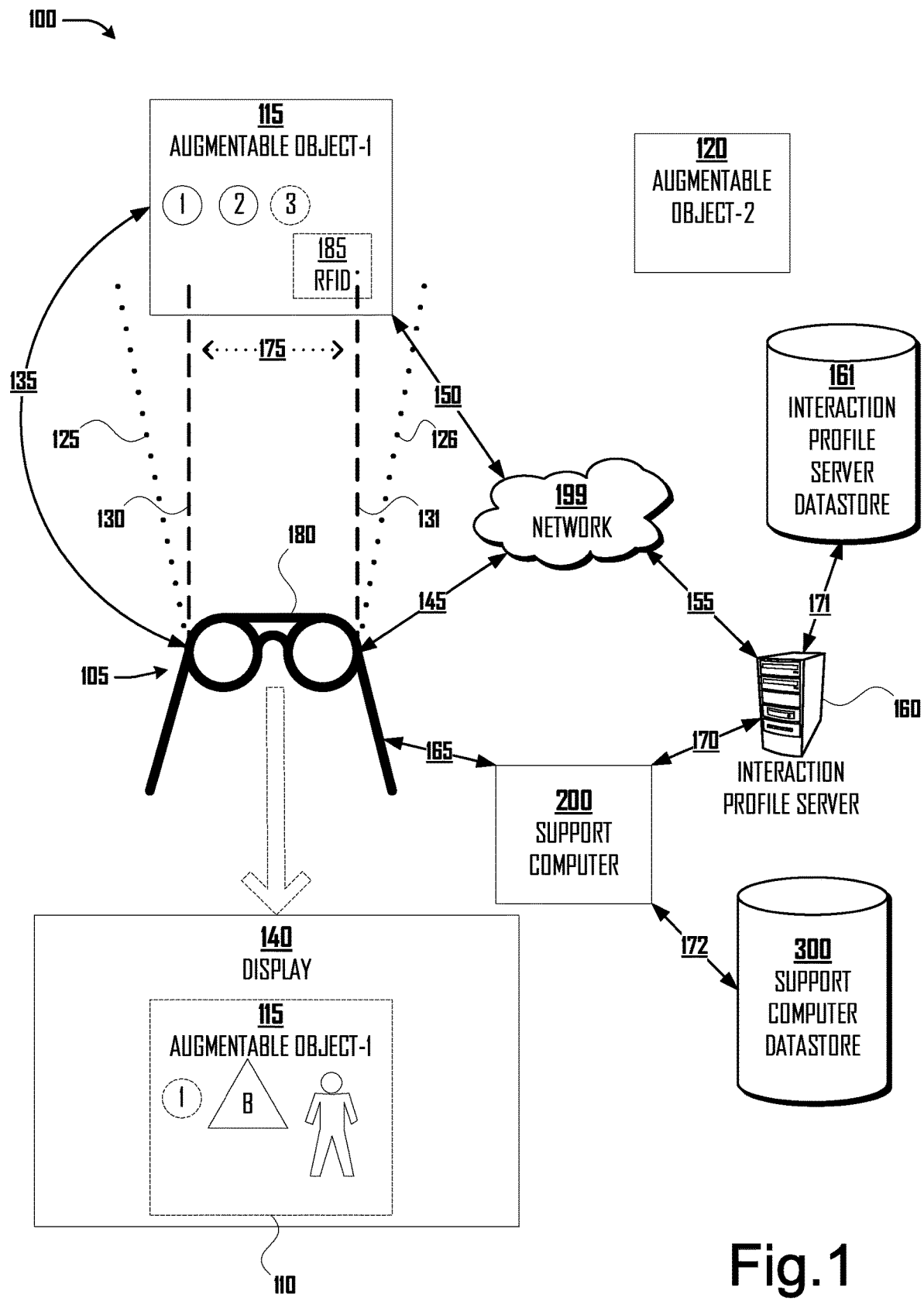
FIG. 1 illustrates an example of an optical head-mounted display, a first and a second augmentable object, local support computer and local support computer datastore, interaction profile server and interaction profile server datastore, network, and a field of view and display area of the optical head-mounted display, according to embodiments of the present disclosure.

The following description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein", "above", "below" and words of similar import, when used in this application, shall refer to this application as a whole and not to particular portions of this application. When the context permits, words in the above Detailed Description using the singular may also include the plural while words using the plural may also include the singular. The word "or," in reference to a list of two or more items, covers all of the following interpretations of the word: any of the items in the list, all of the items in the list, and any combination of one or more of the items in the list.

In overview, apparatuses, systems, methods and storage media associated with augmenting reality using an antenna and an interaction profile are described herein. In embodiments, the antenna may be a directional antenna. The directional antenna may be in a wearable computer device, such as an OHMD. The wearable computer device may be supported by one or more support computer(s), to execute or perform functions of, required by, or in assistance of the wearable computer device. The support computer may be in or proximate to the wearable device. This paper may discuss functions, modules, or software as being executed by the support computer and/or wearable device, interchangeably (a statement that the wearable computer device executes a module should be understood to mean that the wearable computer device or the support computer executes the module).

The directional antenna may be a narrow beam width directional antenna with a high gain for a wireless signal in a receive area. The directional antenna may comprise a parabolic, helical, or yagi antenna or the like and/or a phased array of antennas (including a phased array of omnidirectional antennas).

The wireless signal may be an electromagnetic signal, such as a radio, infrared, or optical signal; the wireless signal may be spontaneously transmitted by an augmentable object, it may be actively transmitted in response to a signal from the wearable device, or it may be passively transmitted or reflected by the augmentable object in response to a signal from the wearable device, such as via a radio-frequency identification tag ("RFID"), or in response to environmental radio frequency energy (such as visible light). The wireless signal may have a range on the order of one hundred feet or less, such as twenty feet. The receive area of the directional antenna may be less than or equal to a field of view of a person. The receive area may aligned with a normal viewing perspective of a wearer of the wearable device.

Upon an augmentable object coming into the receive area of the directional antenna, modules executed by the wearable device detect a wireless signal of or associated with the augmentable object and obtain an identifier of the augmentable object and/or a network path, such as a uniform resource identifier ("URI"), which may be followed. The wireless signal may further comprise or be used as an orientation token.

Using the identifier and/or network path, module(s) executed by the wearable device obtain an interaction profile for or associated with the augmentable object. The interaction profile comprises a digital object and (optionally) a configuration parameter of the digital object.

The digital object may comprise, for example, a representation of the physical body of the augmentable object or component thereof, such as a 2D or 3D image, map, or point cloud of the augmentable object or component thereof, which component may be defined in terms of an anchor point in the augmentable object point cloud; alternatively and or in addition, such digital object may comprise an orientation token which allows the orientation and scale of augmentable object relative to a wearable device to be determined. The digital object may comprise, for example, a sound and/or graphical output or way to obtain and output the sound and/or graphical output; as discussed further below, the output may be processed according to an orientation and scale of the augmentable object relative to the wearable device, such that, for example, graphical (or audio) output by the wearable device, such as a digital image, is overlaid on the view of the augmentable object from the perspective of the wearable device (or is output, in stereo, from such perspective) so that the user the wearable device sees an output image overlaid onto the user's view of the augmentable object. The digital object may comprise, for example, at least one anchor point; an anchor point may, for example, define a location in a point cloud, such as in a point cloud of the physical augmentable object. Anchor point may be used to define a location in relation to which output is to be rendered and/or in relation to which input from a user or another party or process is to be received. The digital object may comprise, for example, a user interface; the user interface may associate one or more other digital objects and (optionally) user (or other party) input, thereby allowing control of digital objects associated with the augmentable object.

For example, a photogrammetry module executed by the wearable device may determine a point cloud of an environment around (typically in front) of the wearable device. A module executed by the wearable device may identify an augmentable object according to a wireless signal from the augmentable object, use the wireless signal to obtain an interaction profile for the augmentable object, obtain from the interaction profile a first digital object comprising a point cloud of the physical augmentable object, determine an orientation and scale of the point cloud of the physical augmentable object relative to the environmental point cloud, obtain a second digital object comprising an anchor point in the point cloud of the physical augmentable object, wherein the anchor point in the point cloud of the physical augmentable object may be associated with a user input, obtain a third digital object comprising an output sound and/or graphic, obtain a fourth digital object comprising a user interface for the augmentable object, wherein the user interface associates the anchor point with the output sound and/or graphic and (optionally) a user input. The user input may be, for example, an input to a button, keyboard, mouse, a gesture, a vocalization, or other user input. A user input comprising a gesture may be relative to a field of view of a camera of the wearable device.

In this example, the user of the wearable device may see an augmentable object in proximity to the user and orient the user's head toward the augmentable object. When the directional antenna in the wearable device is oriented toward the augmentable object, the wearable device obtains an interaction profile for the augmentable object. The wearable device obtains and instantiates digital objects from the interaction profile. The digital objects may cause the wearable device to output an image onto the user's view of the augmentable object. For example, the output image may make it appear as though the augmentable object is a "radio" with "knobs" to control the volume of the "radio". When the user interacts with the "knobs", user may turn the volume up or down.

In this example, before the user interacted with the augmentable object, the user did not need to install software to enable the interaction, the augmentable object did not need to be mapped, with content being associated with the mapped location. The user was able to access features of the augmentable object just by placing the augmentable object within the view of the user.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "at least one of A, B, or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), a System on a Chip (SoC), an electronic circuit, a processor (shared, dedicated, or group) and/or memory (shared, dedicated, or group) that execute one or more software or firmware programs, a combinational logic circuit, and/or other suitable components that provide the described functionality.

As used herein, "direction antenna" means a narrow beam width directional antenna with a high gain for a wireless signal in a receive area. The directional antenna may comprise a parabolic, helical, or yagi antenna or the like and/or a phased array of antennas (including a phased array of omnidirectional antennas).

As used herein, "wearable device" means an optical head-mounted display ("OHMD"). OHMD comprises directional antenna and may also comprise an image and/or video output display. Image and/or video display may be via a screen of another computer device (such as support computer 200), display via projection of an image onto lenses of wearable device, display via projection of an image into the eyes of a user of wearable device, or the like. OHMD may also comprise an audio output device (earbuds, speakers, and the like), camera, gyroscopic, magnetic, inertial or other sensors used for dead reckoning or absolute position determination, access to Global Positioning System ("GPS") data and/or location-determining services. OHMD may also comprise a user interface, such as tactile buttons, keyboard, mouse, touch-sensitive tablet, touch sensitive portion of the wearable device, or the like. Wearable device may comprise a computer and/or may be coupled (or paired) with a support computer, such as support computer 200 (described further herein). Wearable device may have the form factor of a pair of glasses.

Referring to FIG. 1 and scene 100, wearable device 105 may comprise directional antenna 180. A user of wearable device 105 will have a field of view illustrated by field-of-view dotted line 125 and field-of-view dotted line 126. Direction antenna 180 is illustrated in FIG. 1 as having reception area 175, between reception area dotted line 130 and 131. As illustrated, reception area 175 may, for example, be within the field of view of use of wearable device 105. Reception area 175 may be wider or narrower than as illustrated.

Also illustrated in FIG. 1 are augmentable object-1 115 and augmentable object-2 120. As illustrated in FIG. 1, augmentable object-1 115 and augmentable object-2 120 are meant to be physical objects, with physical bodies in the real world. Augmentable object-1 115 is illustrated as having components, illustrated with numbered circles 1, 2, and 3. These components may be physical components or logical components. For the sake of this discussion, circles 1 and 2 shall be discussed as being physical components of augmentable object-1 115, while circle 3 shall be discussed as a logical component (that is to say, without a corresponding physical structure on augmentable object-1 115); for this reason, circle 3 is illustrated with a dotted line perimeter.

Augmentable object-1 115 comprises a wireless signal emitter or reflector, in RFID 185. RFID 185 may emit or reflect an electromagnetic or wireless signal, such as a radio, infrared, or optical signal; the wireless signal may be spontaneously transmitted by an augmentable object, it may be actively transmitted in response to a signal from the wearable device, or it may be passively transmitted or reflected by the augmentable object in response to a signal from the wearable device, such as via a radio-frequency identification tag ("RFID"), or in response to environmental radio frequency energy (such as visible light). The wireless signal may encode an identifier of augmentable object-1 115. Communication of wireless signal between augmentable object-1 115 and wearable device 105 is illustrated by arrow 135.

Also illustrated in FIG. 1 is Display 140. Display 140 provides an example of a graphical display area of wearable device 105. When worn by a user, display 140 may reflect, project, or otherwise provide images to a user of wearable device 105. As illustrated in FIG. 1, display 140 may be overlaid onto the field of view of the user of wearable device 105. In FIG. 1, augmentable object-1 115 is illustrated within dotted line box 110 within display 140 to illustrate that this is the view of augmentable object-1 115 as seen by a user of wearable device 105. As illustrated in FIG. 1, circle 1 within dotted line box 110 is dotted line to illustrate that the user's view of circle 1 is unmodified and corresponds to circle 1 in augmentable object-1 115. As illustrated in FIG. 1, instead of circle 2 within dotted line box 110 (as in the real augmentable object-1 115) there is triangle "B", which indicates that circle 2 of augmentable object-1 115 has been modified with a graphic by wearable device 105 to appear within Display 140 so that user sees triangle "B". As illustrated in dotted line box 110, there is a human figure in the position of circle 3, which indicates that circle 3 of augmentable object-1 115 has caused wearable device 105 to output an image of a human figure. The dotted-line arrow between wearable device 105 and display 140 indicates that display 140 may be output by wearable device 105.

Modification of augmentable object-1 115 has been performed by modules executed by wearable device 105 and/or support computer 200 (also found in FIG. 1). As discussed herein, execution of modules described herein may be by wearable device 105 and/or support computer 200. Support computer 200 may be physically separate from wearable device 105 or may be integrated into wearable device 105.

Though illustrated in FIG. 1 with the form factor of a pair of glasses, and though discussed as a "wearable device", wearable device 105 may also be provided by a suitably configured smartphone, tablet computer, laptop computer, or the like. A description of support computer 200 is provided herein, which description should be understood to apply to embodiments of wearable device 105. Wearable device and support computer may also be referred to herein as "sensory output device".

Also illustrated in FIG. 1 is support computer datastore 300. Support computer datastore 300 is described further, herein, though, generally, it should be understood as a datastore used by support computer 200.

Also illustrated in FIG. 1 are interaction profile server 160 and interaction profile server datastore 161. As described further herein, interaction profile server 160 and interaction profile server datastore 161 may provide interaction profile to wearable device 105, for example, following contact by reception area 175 with augmentable object-1 115 (and following execution of modules described herein).

Also illustrated in FIG. 1 is network 199. Network 199 may comprise computers, network connections among the computers, and software routines to enable communication between the computers over the network connections. Examples of Network 199 comprise an Ethernet network, the Internet, and/or a wireless network, such as a GSM, TDMA, CDMA, EDGE, HSPA, LTE or other network provided by a wireless service provider. Connection to Network 199 may be via a Wi-Fi connection. More than one network may be involved in a communication session between the illustrated devices. Connection to Network 199 may require that the computers execute software routines which enable, for example, the seven layers of the OSI model of computer networking or equivalent in a wireless phone network. Network communication among the various components is illustrated by communication arrows 135, 145, 150, 155, 165, 170, 171, and 172.

Also illustrated in FIG. 1 is augmentable object-2 120. Augmentable object-2 120 has not been contacted by reception area 175, though it may nonetheless be proximate to wearable device 105.

This paper may discuss a first computer as connecting to a second computer (such as Support Computer 200 connecting to Interaction Profile Server 160) or to a corresponding datastore (such as to Interaction Profile Server Datastore 161); it should be understood that such connections may be to, through, or via the other of the two components (for example, a statement that a computer device connects with or sends data to Support Computer 200 should be understood as saying that the computer device may connect with or send data to Support Computer Datastore 300). References herein to "database" should be understood as equivalent to "Datastore." Although illustrated as components integrated in one physical unit, the computers and databases may be provided by common (or separate) physical hardware and common (or separate) logic processors and memory components. Though discussed as occurring within one computer device, the software routines or modules and data groups used by the software routines or modules may be stored and/or executed remotely relative to any of the computers through, for example, application virtualization.

Wearable device 105, Support Computer 200, Interaction Profile Server 160, Point of Sale Device 315, and Mobile Client Device 320 may be, for example, a server computer, a mobile computer (such as a mobile "smart" phone, a tablet, or laptop computer), a personal computer, a gaming computer, and/or an Internet-enabled television, or similar computer device.

Figure 2:
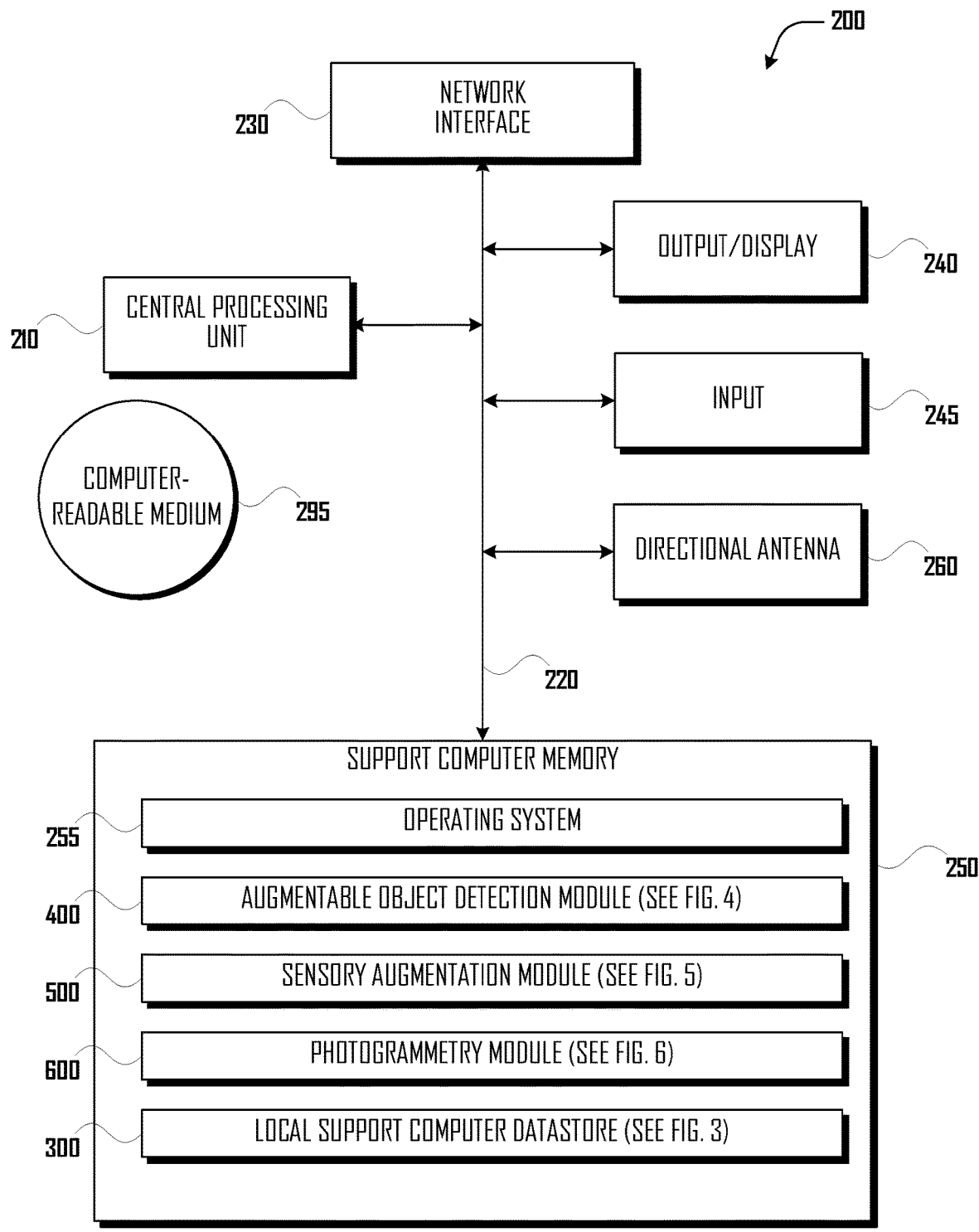
FIG. 2 is a block diagram of an example of a local support computer, including processors, memory components, and modules therein, according to some embodiments.

FIG. 2 is a functional block diagram of an exemplary Support Computer 200 computer device and some data structures and/or components thereof. Support Computer 200 comprises at least one Processing Unit 210, Support Computer Memory 250, (optional) Display 240 or other output and Input 245, all interconnected along with Network Interface 230 via Bus 220. Processing Unit 210 may comprise one or more general-purpose Central Processing Units ("CPU") as well as one or more special-purpose Graphics Processing Units ("GPU"). The components of the Processing Unit 210 may be utilized by Operating System 255 for different functions required by the modules or routines executed by Support Computer 200. Network Interface 230 may be utilized to form connections with Network 199 or to form device-to-device connections with other computers.

Support Computer Memory 250 generally comprises a random access memory ("RAM"), a read only memory ("ROM"), and a permanent mass storage device, such as a disk drive or SDRAM (synchronous dynamic random-access memory). Support Computer Memory 250 stores program code for software modules or routines, such as, for example, augmentable object detection module 400, sensory augmentation module 500, and photogrammetry module 600, as well as, for example, browser, email client and server routines, client applications, and database applications (discussed further below). Additional data groups for modules or routines, such as for a webserver and web browser, may also be present on and executed by Support Computer 200. Webserver and browser modules may provide an interface for interacting with the other computer devices illustrated in FIG. 2 or with other computer devices not illustrated in FIG. 2, for example, through webserver and web browser modules (which may serve and respond to data and information in the form of webpages and html documents or files). The browsers and web servers are meant to illustrate user-interface and user-interface enabling routines generally, and may be replaced by equivalent modules or routines for serving and rendering information to and in a device and/or user interface in a computer device (whether in a web browser or in, for example, a mobile device application).

In addition, Support Computer Memory 250 also stores an Operating System 255. These software components may be loaded from a non-transient Computer Readable Storage Medium 295 into Support Computer Memory 250 using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

Support Computer 200 may also comprise hardware supporting output modalities, Output/Display 240, such as, for example, a screen, including a screen in or of wearable device 105, an audio output device such as speaker/headphones, haptic output, and the like.

Support Computer 200 may also comprise hardware supporting input modalities, Input 245, such as, for example, a touchscreen, a camera (including cameras used to record the surroundings and cameras used for gesture input), a depth camera, a keyboard, a mouse, a trackball, a stylus, motion detectors, and a microphone. Input 245 may also serve as Display 240, as in the case of a touchscreen display which also serves as Input 245, and which may respond to input in the form of contact by a finger or stylus with the surface of Input 245.

Figure 3:
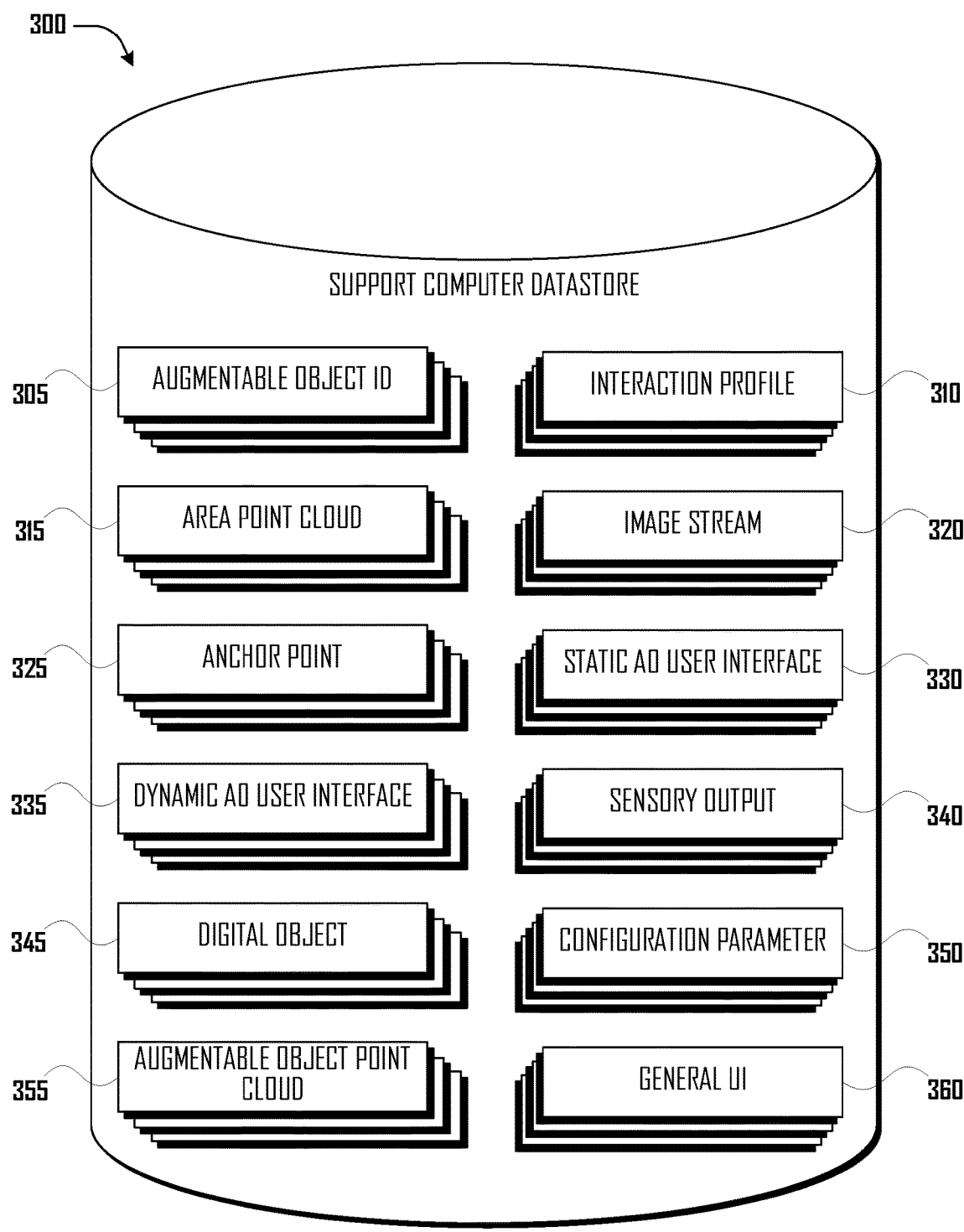
FIG. 3 is a block diagram of an example of a local support computer datastore, including examples of data records therein, according to some embodiments.

Support Computer 200 may also comprise or communicate via Bus 220 with Support Computer Datastore 300, illustrated further in FIG. 3. In various embodiments, Bus 220 may comprise a storage area network ("SAN"), a high speed serial bus, and/or via other suitable communication technology. In some embodiments, Support Computer 200 may communicate with Support Computer Datastore 300 via Network Interface 230. Support Computer 200 may, in some embodiments, include many more components than those shown in this Figure. However, it is not necessary that all of these generally conventional components be shown in order to disclose an illustrative embodiment.

FIG. 3 is a functional block diagram of the Support Computer Datastore 300 illustrated in the computer device of FIG. 2. The components of the Support Computer Datastore 300 are data groups used by modules or routines. The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

The components of support computer datastore 300 are discussed further herein in the discussion of other of the Figures. In overview, illustrated is augmentable object ID 305, which may be one or more records comprising an identifier of an augmentable object and/or a network path obtain from or in relation to an augmentable object. Illustrated is interaction profile 310, which may be one or more records comprising one or more digital objects associated with an augmentable object; digital object 345 records are called out in support computer datastore 300, as well as examples of sub-types of digital objects, such as anchor point 325, sensory output 340, and augmentable object point cloud 355 records. Illustrated is area point cloud 315, which may be one or more records comprising a 2D or 3D map, geometric definition of topographic features, point cloud (set of points in a coordinate system), patterns which may be located in an image, or the like with respect to an area. Area point cloud 315 may be prepared by, for example, photogrammetry module 600, or may be obtained from a third party. Illustrated is image stream 320, which may be one or more records comprising a stream of images or video from a camera in or accessible to support computer 200. Illustrated is anchor point 325, which may be one or more records comprising a reference point or location in augmentable object point cloud 355; anchor point 325 may be a sub-type of a digital object. Illustrated is static augmentable object (abbreviated as "AO") user interface 330, which may be one or more records comprising a complete, uninstantiated, user interface for an augmentable object. Illustrated is dynamic augmentable object user interface 335, which may be one or more records comprising an instantiated user interface, such as a static augmentable object user interface 330 instantiated with respect to a particular view of an augmentable object and at a particular time. Illustrated is sensory output 340, which may comprise one or more records describing output which is meant to be perceived by a human, such as audio or an image (including a sequence of images in a video); sensory output 340 may be a sub-type of a digital object. Illustrates is digital object 345, which may comprise one or more records obtained from interaction profile 310 record(s) and which define a digital object associated with an augmentable object. Illustrated is configuration parameter 350, which may comprise one or more records obtained from interaction profile 310 record(s) and which define configuration parameters which may be associated with a digital object. Illustrated is augmentable object point cloud 355, which may comprise one or more records obtained from interaction profile 310 record(s) and which comprise a 2D or 3D map, geometric definition of the topographic features, or point cloud of an augmentable object; augmentable object point cloud 355 may be a sub-type of a digital object. Illustrated in general UI 360, which may comprise one or more records defining the general purpose user interface for a wearable device. In the context of a wearable device which is a laptop computer, smartphone, OHMD, or the like, the general UI 360 may represent components of an operating system, applications executed by the operating system and the like which comprise the user interface for the device.

Figure 4:
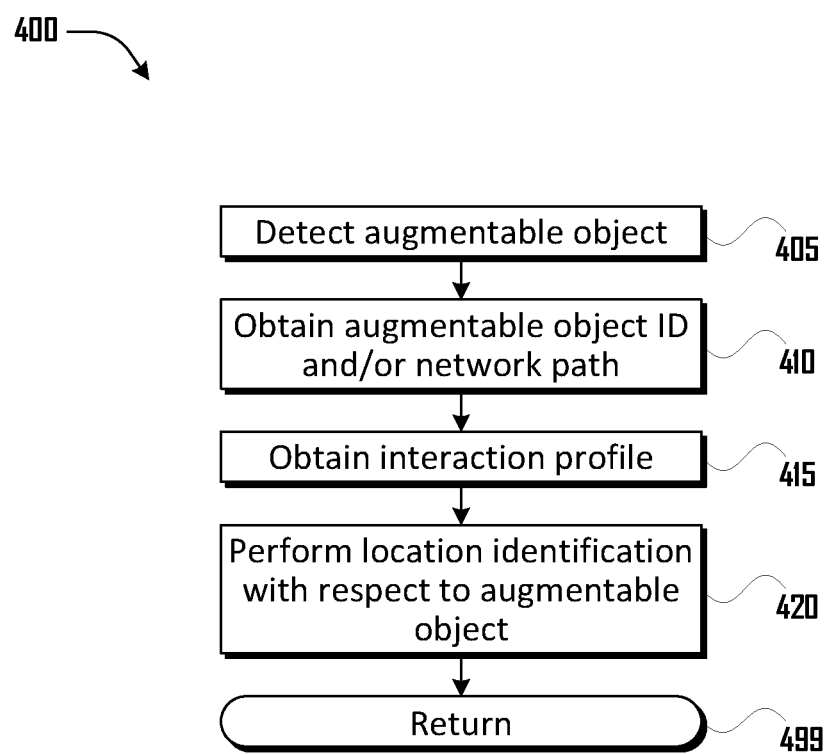
FIG. 4 is a flow diagram illustrating an example/algorithmic structure of an augmentable object detection module, according to various embodiments.

FIG. 4 is a flow diagram illustrating an example of an augmentable object detection module 400, according to various embodiments. Augmentable object detection module 400 may be executed by, for example, wearable device 105 and/or support computer 200, when, for example, an augmentable object comes within reception area 175 of directional antenna 180.

At block 405, augmentable object detection module 400 may detect an augmentable object. This may occur when, for example, an augmentable object comes within reception area 175 of directional antenna 180 and directional antenna 180 receives a wireless signal from augmentable object, such as from RFID 185. This may occur when augmentable object transmits or reflects the wireless signal, whether spontaneously or in response to a signal transmitted by support computer 200. As noted herein, the wireless signal may be transmitted by an RFID tag, it may be a code which may be detected optically in a digital photograph taken by support computer 200, or the like.

At block 410, augmentable object detection module 400 may obtain augmentable object ID and/or a network path from the wireless signal received at block 405. Completion of block 410 may involve receiving the data directly from the augmentable object or it may involve contacting a database, a third party, or the like. Augmentable object ID and/or a network path may be stored as, for example, one or more augmentable object ID 305 records.

At block 415, augmentable object detection module 400 may obtain an interaction profile associated with the augmentable object or augmentable object ID 305 record. The interaction profile may be obtained by following a network path and/or presenting an augmentable object identifier. The interaction profile may be obtained from, for example, the augmentable object directly (in cases where the augmentable object comprises data and communication resources) and/or from interaction profile server 160. The party operating interaction profile server 160 may be a provider of augmentable objects and/or may be a provider of services in relation to augmentable objects.

The obtained interaction profile may be stored in, for example, one or more interaction profile 310 records. Components of the obtained interaction profile may be store in one or more digital object 345 record(s), including in anchor point 325 records, sensory output 340 records, and augmentable object point cloud 355 records.

At block 420, and if not already performed, augmentable object detection module 400 may perform location identification with respect to augmentable object. This may be performed using, for example, a phased array of receivers in wearable device (which phased array may bi- or trilaterate location of the emitter of the wireless signal), a depth camera in wearable device, access to a location service which may provide location information with respect to augmentable object or the like. Wireless signal may comprise or be used as an orientation token with respect to augmentable object. This information may be store in, for example, an area point cloud 315 record.

At block 499, augmentable object detection module 400 may conclude and/or may return to a process which spawned it.

Because wearable device 105 comprises directional antenna and because wearable device 105 may be executing augmentable object detection module 400, wearable device 105 may detect an augmentable object and obtain an interaction profile associated therewith, conveniently and without any affirmative act by the user of wearable device 105, beyond merely looking at or otherwise directing reception area 175 of wearable device 105 to intersect with an augmentable object.

Figure 5:
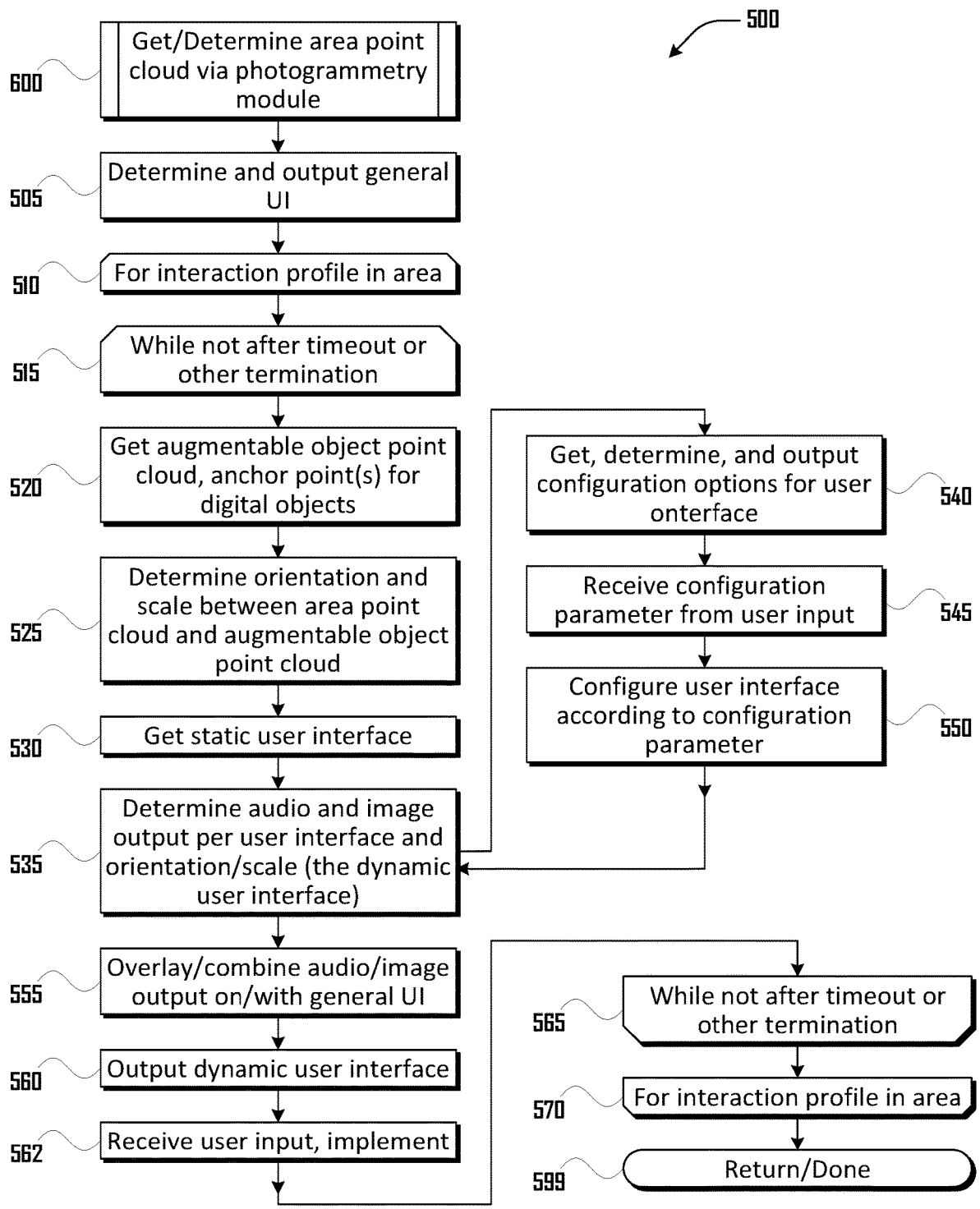
FIG. 5 is a flow diagram illustrating an example/algorithmic structure of a sensory augmentation module, according to various embodiments.

FIG. 5 is a flow diagram illustrating an example of sensory augmentation module 500, according to various embodiments. Sensory augmentation module 500 may be executed by, for example, wearable device 105 and/or support computer 200, when, for example, an augmentable object came within reception area 175 of directional antenna 180 and an interaction profile for the augmentable object has been obtained.

At block 600, sensory augmentation module 500 may obtain and/or determine an area point cloud, such as an area point cloud 315 record. This may be accomplished by execution of, for example, photogrammetry module 600 (discussed herein).

At block 505, sensory augmentation module 500 may determine and output a general user interface for wearable device, such as according to general UI 360 record(s). The general user interface for wearable device may allow the user to interact with wearable device, such as to provide input to wearable device, such as to touch a button or issue a command to execute a process, record an image, video, or the like, and/or to cause wearable device to output sensory output, such as image(s) in a display of wearable device and/or audio via earbuds or via other output or display 240.

Opening loop block 510 to closing loop block 570 may iterate over each interaction profile obtained by support computer 200, such as during execution of augmentable object detection module 400. This iteration may begin when an augmentable object comes within, for example, a reception area of a directional antenna in a wearable device, such as reception area 175 in wearable device 105; this iteration may require that the augmentable object remain within the reception area and may exit automatically upon augmentable object exiting reception area or this iteration may begin upon obtaining an interaction profile and may exit upon another termination event, such as a user input, a timeout, or another termination event.

Opening loop block 515 to closing loop block 565 may iterate so long as a timeout, movement of augmentable object outside of a reception area of a directional antenna, user input to this effect, and/or other termination event has not occurred.

At block 520, sensory augmentation module 500 may obtain from the interaction profile, such as interaction profile 310 associated with a then-current augmentable object, digital objects, such as digital object 345 record(s). At block 520, an obtained digital object may be an augmentable object point cloud, which may be or have been saved as, for example, augmentable object point cloud 355 record(s) 415. This may be a representation of a physical body of the augmentable object, such as a 2D or 3D image, map, or point cloud. This may also or alternatively be an orientation token which allows the orientation and scale of augmentable object relative to a wearable device to be determined. The augmentable object point cloud may comprise or be associated with one or more anchor point(s), which may be or may have been saved in one or more anchor point 325 records. Anchor points may be used to orient components of augmentable object with respect to other digital objects, such as sensory output, and/or to orient augmentable object point cloud relative to area point cloud. For example, if area point cloud includes a bar code, a pattern in the structure of the augmentable object, other pattern which may be detected (including optically detected), and/or location information produced with respect to the augmentable object, such as at block 420, and if augmentable object point cloud includes an anchor point which aligns with the bar code or other detectable pattern or location information, then such anchor point may be used to facilitate alignment of augmentable object point cloud and area point cloud.

At block 525, sensory augmentation module 500 may place or locate augmentable object point cloud in area point cloud and may determine an orientation and scale between area point cloud of block 600 and augmentable object point cloud. This may be aided by, for example an anchor point in augmentable object point cloud and a corresponding bar code, other detectable pattern in, or location information in area point cloud with respect to augmentable object. This may be performed by pattern matching between area point cloud and augmentable object point cloud. This may be aided by depth or other location information which may have been produced during detection of the wireless signal (s) from augmentable object. This may be performed by point set registration or point matching between the two point clouds, which point set registration seeks to reduce the distance between the two point sets to a global minimum.

At block 530, sensory augmentation module 500 may obtain from one or more digital objects associated with the augmentable object, the static or uninstantiated user interface for or associated with the augmentable object, which may be or may have been saved in one or more static augmentable object user interface 330 records. The static augmentable object user interface may comprise components of the augmentable object described in augmentable object point cloud, digital objects including sensory output, anchor point(s), user input which may be received in relation to the augmentable object and/or components thereof, output which may be produced in relation to user input, and the like.

At block 535, sensory augmentation module 500 may determine audio and image output per the user interface and the orientation and scale of block 525. This determined audio and image output may be saved as, for example, one or more dynamic augmentable object user interface 335 records. At block 555, sensory augmentation module 500 may overlay or otherwise combine the determined dynamic augmentable object user interface onto or with the general UI of block 505. At block 560, sensory augmentation module 500 may output the dynamic augmentable object user interface. At block 562, sensory augmentation module 500 may receive and implement user input, according to the digital objects and user interface. The user input of block 562 and/or the audio and image output of block 535 and/or the dynamic user interface output at block 562 may cause audio to be played by the "radio", such as out of the speaker of the "radio" (if the speaker is real and if the augmentable object comprises a network connection) or out of earbuds worn by the user, or the like.

Block 540 to block 550 may iterate within block 535.

At block 540, sensory augmentation module 500 may get and output configuration options for digital objects in the user interface. A determination may be involved in this block, if not all components/digital object of the augmentable object are visible and/or configurable, to determine which components of the augmentable object are configurable.

At block 545, sensory augmentation module 500 may receive configuration parameters from user input in relation to the configurable digital object(s).

At block 550, sensory augmentation module 500 may configure the user interface and digital objects therein according to the received configuration parameter(s) from the user input.

At block 599, sensory augmentation module 500 may return to its start, to a process which spawned sensory augmentation module 500, or may conclude.

For example, an augmentable object may comprise two "knobs", which may not physically turn, and a flat "speaker", which may output sound. The augmentable object may be configurable as a "radio" which outputs content from a user's audio streaming service. A user has not previously seen nor interacted with the "radio". The user wears a wearable device comprising a directional antenna. When the user looks at the "radio", the wearable device and augmentable object detection module or the equivalent detects a wireless signal which identifies the "radio" as an augmentable object and/or provides a link to an interaction profile for or associated with the "radio". Sensory augmentation module or the equivalent obtains digital objects from the interaction profile.

The digital objects include an augmentable object point cloud. Sensory augmentation module and/or photogrammetry module also determines a point cloud of the area ("area point cloud"). The augmentable object point cloud describes the shape of the augmentable object, including the two "knobs". The sensory augmentation module orients and scales the augmentable object point cloud relative to the area point cloud, such that the "radio" can be located in the view of the real world experienced by the user of the wearable device.

A static user interface for the "radio"—a user interface independent of the area in which the augmentable objection may be temporarily located—defines that one of the "knobs" is to be overlaid with a blue light while the other "knob" is to be overlaid with a red light. Because the location of the point cloud of the augmentable object is determined within the area point cloud, the red and blue lights may be output by the wearable device in a dynamic version of the static user interface, such that the user sees the red and blue lights on the corresponding components in the real world. For example, the physical orientation of the augmentable object may allow the user to see only the red "knob", in which case the wearable device may output only the red light in the dynamic user interface, notwithstanding that the static user interface comprises two "knobs".

The static user interface may also define that user gesture input in relation to the blue "knob" may change the "channel" (such as may change playlists) while user gesture input in relation to the red "knob" changes the volume.

Configuration options for digital objects in the dynamic or static user interface may be received and implemented. For example, configuration options may allow the user to change which playlists the "radio" may cycle through when the user provides gesture input in relation to the blue "knob".

Figure 6:
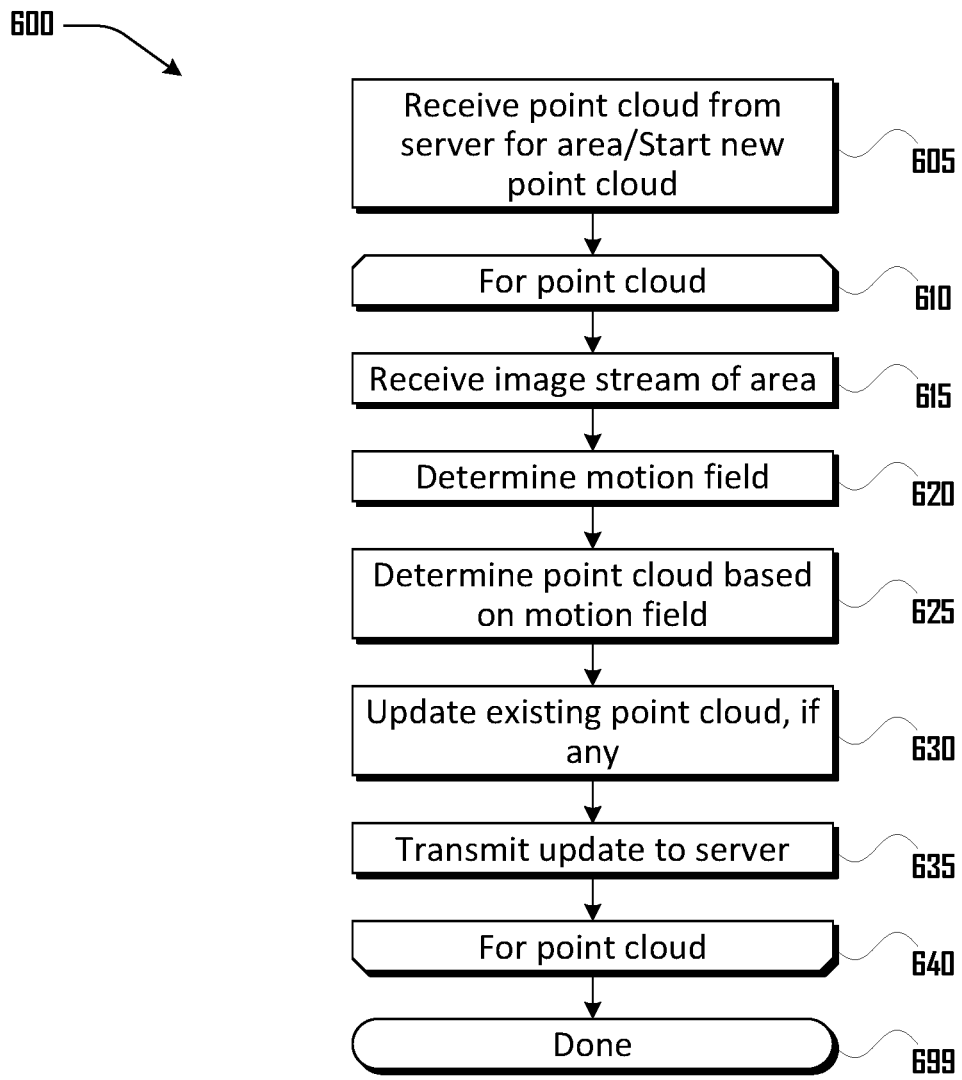
FIG. 6 is a flow diagram illustrating an example/algorithmic structure of a photogrammetry module, according to various embodiments.

FIG. 6 is a flow diagram illustrating an example of photogrammetry module 600, according to various embodiments. Photogrammetry module 600 may be executed by, for example, wearable device 105 and/or support computer 200. Photogrammetry module 600 may be executed as subroutine, such as within sensory augmentation module, or may be executed independently.

At block 605, photogrammetry module 600 may report its location to a server and receive an existing area point cloud for the area, such as one formed by the contributions of many instances of photogrammetry module 600 executed by different devices, and/or photogrammetry module 600 may start a new point cloud.

Opening loop block 610 to closing loop block 640 may iterate for a then-current point cloud (whether new or existing).

At block 615, photogrammetry module 600 may receive an image stream of an area. The image stream may be produced by, for example, camera(s) in a wearable device, such as wearable device 105. The image stream may be saved in one or more image stream 320 records.

At block 620, photogrammetry module 600 may determine a motion field, optical flow, or the like with respect to the image stream (generally referred to herein as a "motion field"). The motion field may be determined based on edges, corners, distinctive colors or the like. Determination of the motion field may be aided by inertial sensor, compass, GPS and similar location and orientation information from the device hosting the camera(s), such as from wearable device 105; determination of the motion field may be aided by depth information from a depth camera.

At block 625, photogrammetry module 600 may determine area point cloud based on the motion filed of block 620. The determined area point cloud may be saved as, for example, one or more area point cloud 315 records.

At block 630, photogrammetry module 600 may update an existing or previous area point cloud, if any, based on the determined area point cloud of block 630. For example, non-rigid registration may consolidate more than one point cloud(s) into one.

At block 635, photogrammetry module 600 may transmit area point cloud of block 625 and/or updated area point cloud of block 630 to a server, third party, or other party.

At block 640, photogrammetry module 600 may return to block 610 and/or block 605 to start a new point cloud or to update an existing point cloud.

At block 699, photogrammetry module 600 may conclude or return to a process which spawned it.

To implement the foregoing modules, any combination of one or more computer usable or computer readable medium (s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the a user's computer (such as a wearable device or support computer), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computer system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1

An apparatus for augmenting reality, comprising: a sensory output device, a computer processor, a memory, and an antenna; an augmentable object detection module coupled to the computer processor, the augmentable object detection module to detect an augmentable object, wherein to detect the augmentable object, the augmentable object detection module is to use the antenna to receive a wireless signal of the augmentable object; a sensory augmentation module coupled to the computer processor, the sensory augmentation module to control the sensory output device to output a sensory output, wherein to control the sensory output device to output the sensory output, the sensory augmentation module is to use the wireless signal to obtain an interaction profile associated with the augmentable object and determine the sensory output based on the interaction profile.

Example 2

The apparatus according to Example 1, wherein the apparatus may be a wearable device, and wherein the antenna may be a narrow beam width directional antenna with a high gain for the wireless signal in a receive area, and the receive area may be equivalent to a field of view of a wearer of the apparatus.

Example 3

The apparatus according to Example 2, wherein the apparatus may comprise an optical head-mounted display, the receive area may be aligned with a normal viewing perspective of the wearer of the apparatus, and the sensory output device outputs at least one of an image and a sound.

Example 4

The apparatus according to Example 2, further comprising a photogrammetry module coupled to the computer processor to determine a point cloud of an area comprising the receive area ("area point cloud"), wherein to determine the area point cloud the photogrammetry module is to receive a set of images comprising the receive area, measure a motion field based on the set of images, and determine the area point cloud based on the motion field; and wherein determine the sensory output based on the interaction profile comprises determine the sensory output based on the interaction profile and the area point cloud.

Example 5

The apparatus according to Example 4, wherein the sensory output comprises a video and wherein the interaction profile comprises a point cloud of the augmentable object ("augmentable object point cloud") and a graphical user interface of the augmentable object and wherein the sensory augmentation module is to determine a relative orientation between the area point cloud and the augmentable object point cloud, and wherein the sensory augmentation module is to determine an image according to the graphical user interface and the orientation and is to output the image in the video.

Example 6

The apparatus according to Example 5, wherein the graphical user interface comprises at least one of a digital object, an anchor point in the augmentable object point cloud, or a user input for controlling the augmentable object.

Example 7

The apparatus according to Example 6, wherein the digital object comprises the sensory output associated with a component of the augmentable object.

Example 8

The apparatus according to Example 7, wherein the component of the augmentable object may be defined in terms of the anchor point, wherein the user input may be received relative to the component of the augmentable object, and wherein the user input may control the sensory output.

Example 9

The apparatus according to Example 1, wherein the interaction profile comprises at least one of a digital object associated with the augmentable object, a user interface for controlling the augmentable object according to a user input, a configuration parameter of the digital object, or a point cloud of the augmentable object ("augmentable object point cloud").

Example 10

The apparatus according to Example 9, wherein the digital object may be associated with the sensory output and wherein the sensory augmentation module may be to receive the user input and determine the sensory output according to the user input, the graphical user interface, and the digital object.

Example 11

The apparatus according to any one of Example 1 to Example 10, wherein the sensory augmentation module may be to obtain the interaction profile from one of the augmentable object or a network datastore.

Example 12

The apparatus according to any one of Example 1 to Example 10, wherein the wireless signal comprises at least one of an identifier of the augmentable object, a network path to obtain the interaction profile, or an orientation token.

Example 13

The apparatus according to any one of Example 1 to Example 10, wherein the sensory output device comprises an imaging device, which imaging device captures an image stream, and wherein the sensory augmentation module may be to compose the sensory output according to the image stream and the interaction profile.

Example 14

The apparatus according to any one of Example 1 to Example 10, wherein the wireless signal may be received from at least one of a radio-frequency identification tag ("RFID") or an electromagnetic transmitter of the augmentable object.

Example 15

A computer implemented method for augmenting reality, comprising: with an antenna of a computer device, detecting a wireless signal of an augmentable object; with the wireless signal, obtaining, by the computer device, an interaction profile associated with the augmentable object; and determining, by the computer device a sensory output based on the interaction profile.

Example 16

The method according to Example 15, wherein the antenna may be a narrow beam width directional antenna with a high gain for the wireless signal in a receive area, wherein the receive area may be equivalent to a field of view of a wearer of the computer device.

Example 17

The method according to Example 16, wherein the computer device comprises an optical head-mounted display, the receive area may be aligned with a normal viewing perpective of the wearer of the computer device, and the sensory output comprises at least one of an image and a sound.

Example 18

The method according to Example 16, further comprising the computer device determining a point cloud of an area comprising the receive area ("area point cloud") by receiving a set of images comprising the receive area, measuring a motion field based on the set of images, and determining the area point cloud based on the motion field; wherein determining the sensory output based on the interaction profile comprises determining the sensory output based on the interaction profile and the area point cloud.

Example 19

The method according to Example 18, wherein the sensory output comprises a video and wherein the interaction profile comprises a point cloud of the augmentable object ("augmentable object point cloud") and a graphical user interface of the augmentable object; and further comprising the computer device determining a relative orientation between the area point cloud and the augmentable object point cloud, determining an image according to the graphical user interface and the orientation, and outputting the image in the video.

Example 20

The method according to Example 19, wherein the digital object comprises the sensory output associated with a component of the augmentable object.

Example 21

The method according to Example 20, the component of the augmentable object may be defined in terms of the anchor point, wherein the user input may be received relative to the component of the augmentable object, and wherein the user input may control the sensory output.

Example 22

The method according to Example 15, wherein the interaction profile comprises at least one of a digital object associated with the augmentable object, a user interface for controlling the augmentable object according to a user input, a configuration parameter of the digital object, or a point cloud of the augmentable object ("augmentable object point cloud").

Example 23

The method according to Example 22, wherein the digital object may be associated with the sensory output and further comprising receiving the user input and determining the sensory output according to the user input, the graphical user interface, and the digital object.

Example 24

The method according to any one of Example 15 to Example 23, further comprising the computer device obtaining the interaction profile from one of the augmentable object or a network datastore.

Example 25

The method according to any one of Example 15 to Example 23, wherein the wireless signal comprises at least one of an identifier of the augmentable object and a network path to obtain the interaction profile.

Example 26

The method according to any one of Example 15 to Example 23, wherein the sensory output device comprises an imaging device, which imaging device captures an image stream, and further comprising the computer device composing the sensory output according to the image stream and the interaction profile.

Example 27

The method according to any one of Example 15 to Example 23, wherein the wireless signal may be received from at least one of a radio-frequency identification tag ("RFID") or an electromagnetic transmitter of the augmentable object.

Example 28

An computer apparatus for augmenting reality, comprising: means to detect a wireless signal of an augmentable object with an antenna of the computer apparatus; means to obtain an interaction profile associated with the augmentable object using the wireless signal; means to determine a sensory output based on the interaction profile; and means to output the sensory output.

Example 29

The apparatus according to Example 28, wherein the antenna may be a narrow beam width directional antenna with a high gain for the wireless signal in a receive area, wherein the receive area may be equivalent to a field of view of a wearer of the computer apparatus.

Example 30

The apparatus according to Example 29, wherein the computer apparatus comprises an optical head-mounted display, the receive area may be aligned with a normal viewing perpective of the wearer of the computer apparatus, and the sensory output comprises at least one of an image and a sound.

Example 31

The apparatus according to Example 29, further comprising means to receive a set of images comprising the receive area, measure a motion field based on the set of images, and determine a point cloud of an area comprising the receive area ("area point cloud") based on the motion field; wherein means to determine the sensory output based on the interaction profile comprises means to determine the sensory output based on the interaction profile and the area point cloud.

Example 32

The apparatus according to Example 31, wherein the sensory output comprises a video and wherein the interaction profile comprises a point cloud of the augmentable object ("augmentable object point cloud") and a graphical user interface of the augmentable object; and further comprising means to determine a relative orientation between the area point cloud and the augmentable object point cloud, determine an image according to the graphical user interface and the orientation, and output the image in the video.

Example 33

The apparatus according to Example 32, wherein the graphical user interface comprises at least one of a digital object, an anchor point in the augmentable object point cloud, or a user input for controlling the augmentable object.

Example 34

The apparatus according to Example 33, wherein the digital object comprises the sensory output associated with a component of the augmentable object.

Example 35

The apparatus according to Example 34, wherein the component of the augmentable object may be defined in terms of the anchor point, wherein the user input may be received relative to the component of the augmentable object, and wherein the user input may control the sensory output.

Example 36

The apparatus according to Example 28, wherein the interaction profile comprises at least one of a digital object associated with the augmentable object, a user interface for controlling the augmentable object according to a user input, a configuration parameter of the digital object, or a point cloud of the augmentable object ("augmentable object point cloud").

Example 37

The apparatus according to Example 36, wherein the digital object may be associated with the sensory output and wherein the apparatus further comprises means to receive the user input and determine the sensory output according to the user input, the graphical user interface, and the digital object.

Example 38

The apparatus according to any one of Example 28 to Example 37, further comprising means to obtain the interaction profile from one of the augmentable object or a network datastore.

Example 39

The apparatus according to any one of Example 28 to Example 37, wherein the wireless signal comprises at least one of an identifier of the augmentable object, a network path to obtain the interaction profile, or an orientation token.

Example 40

The apparatus according to any one of Example 28 to Example 37, wherein the sensory output device comprises an imaging device, which imaging device captures an image stream, and further comprising means to compose the sensory output according to the image stream and the interaction profile.

Example 41

The apparatus according to any one of Example 28 to Example 37, wherein the wireless signal may be received from at least one of a radio-frequency identification tag ("RFID") or an electromagnetic transmitter in the augmentable object.

Example 42

One or more computer-readable media comprising instructions that cause a computer device, in response to execution of the instructions by one or more processors of the computer device, to augment reality as follows: detect, by the computer device, a wireless signal of an augmentable object with an antenna of the computer device; obtain, by the computer device, an interaction profile associated with the augmentable object using the wireless signal; determine, by the computer device, a sensory output based on the interaction profile; and output, by the computer device, the sensory output.

Example 43

The computer-readable media according to Example 42, wherein the antenna may be a narrow beam width directional antenna with a high gain for the wireless signal in a receive area, wherein the receive area may be equivalent to a field of view of a wearer of the computer device.

Example 44

The computer-readable media according to Example 43, wherein the computer device comprises an optical head-mounted display, the receive area may be aligned with a normal viewing perpective of the wearer of the computer device, and the sensory output comprises at least one of an image and a sound.

Example 45

The computer-readable media according to Example 43, further comprising, with the computer device, receive a set of images comprising the receive area, measure a motion field based on the set of images, and determine a point cloud of an area comprising the receive area ("area point cloud") based on the motion field; wherein determine the sensory output based on the interaction profile comprises determine the sensory output based on the interaction profile and the area point cloud.

Example 46

The computer-readable media according to Example 45, wherein the sensory output comprises a video and wherein the interaction profile comprises a point cloud of the augmentable object ("augmentable object point cloud") and a graphical user interface of the augmentable object; and further comprising, with the computer device, determine a relative orientation between the area point cloud and the augmentable object point cloud, determine an image according to the graphical user interface and the orientation, and output the image in the video.

Example 47

The computer-readable media according to Example 46, wherein the graphical user interface comprises at least one of a digital object, an anchor point in the augmentable object point cloud, or a user input for controlling the augmentable object.

Example 48

The computer-readable media according to Example 47, wherein the digital object comprises the sensory output associated with a component of the augmentable object.

Example 49

The computer-readable media according to Example 48, wherein the component of the augmentable object may be defined in terms of the anchor point, wherein the user input may be received relative to the component of the augmentable object, and wherein the user input may control the sensory output.

Example 50

The computer-readable media according to Example 42, wherein the interaction profile comprises at least one of a digital object associated with the augmentable object, a user interface for controlling the augmentable object according to a user input, a configuration parameter of the digital object, or a point cloud of the augmentable object ("augmentable object point cloud").

Example 51

The computer-readable media according to Example 50, wherein the digital object may be associated with the sensory output and further comprising, by the computer device, receive the user input and determine the sensory output according to the user input, the graphical user interface, and the digital object.

Example 52

The computer-readable media according to any one of Example 42 to Example 51, further comprising, by the computer device, obtain the interaction profile from one of the augmentable object or a network datastore.

Example 53

The computer-readable media according to any one of Example 42 to Example 51, wherein the wireless signal comprises at least one of an identifier of the augmentable object, a network path to obtain the interaction profile, or an orientation token.

Example 54

The computer-readable media according to any one of Example 42 to Example 51, wherein the sensory output device comprises an imaging device, which imaging device captures an image stream, and further comprising, by the computer device, compose the sensory output according to the image stream and the interaction profile.

Example 55

The computer-readable media according to any one of Example 42 to Example 51, wherein the wireless signal may be received from at least one of a radio-frequency identification tag ("RFID") or an electromagnetic transmitter in the augmentable object.

The above Detailed Description is not intended to be exhaustive or to limit the disclosure to the precise form disclosed above. While specific embodiments of, and examples for, the disclosure are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

What is claimed is:

1. An apparatus for augmenting reality, comprising:
a sensory output device, a computer processor, a memory, and an antenna;
an augmentable object detection module coupled to the computer processor, wherein the augmentable object detection module is arranged to use the antenna to detect an augmentable object based on a received wireless signal from the augmentable object;
a sensory augmentation module coupled to the computer processor, wherein the sensory augmentation module is arranged to use the received wireless signal to obtain an interaction profile associated with the augmentable object, and determine a sensory output based on the interaction profile and an area point cloud;
an optical head-mounted display coupled with the antenna, wherein the antenna is a narrow beam width directional antenna with a high gain for reception of the wireless signal in a receive area, and the receive area is equivalent to and aligned with a field of view of a wearer of the optical head-mounted display;
a photogrammetry module coupled to the computer processor, wherein the photogrammetry module is arranged to receive a set of images comprising the receive area, measure a motion field based on the set of images, and determine the area point cloud based on the motion field; and
wherein the sensory output comprises a video, wherein the interaction profile comprises a point cloud of the augmentable object and a graphical user interface of the augmentable object, and wherein the sensory augmentation module is further arranged to:
determine a relative orientation between the area point cloud and the point cloud of the augmentable object,
determine an image according to the graphical user interface and the orientation, and
output the image in the video.

2. The apparatus according to claim 1, wherein the graphical user interface comprises at least one of a digital object, an anchor point in the point cloud of the augmentable object, or a user input for controlling the augmentable object, wherein the digital object comprises the sensory output associated with a component of the augmentable object, and wherein the component of the augmentable object is defined in terms of the anchor point, wherein the user input may be received relative to the component of the augmentable object, and wherein the user input may control the sensory output.

3. The apparatus according to claim 1, wherein the wireless signal comprises at least one of an identifier of the augmentable object, a network path to obtain the interaction profile, or an orientation token, wherein the interaction profile comprises at least one of a digital object associated with the augmentable object, a user interface for controlling the augmentable object according to a user input, or a configuration parameter of the digital object, wherein the digital object is associated with the sensory output, and wherein the sensory augmentation module is to receive the user input and determine the sensory output according to the user input, the graphical user interface, and the digital object.

4. A computer implemented method for augmenting reality, the method comprising:
  detecting a wireless signal of an augmentable object with an antenna of a computer device coupled with an optical head-mounted display, wherein the antenna is a narrow beam width directional antenna with a high gain for the wireless signal in a receive area, and the receive area is equivalent to and aligned with a field of view of a wearer of the optical head-mounted display;
  obtaining, by the computer device, an interaction profile associated with the augmentable object based on the wireless signal wherein the interaction profile comprises a point cloud of the augmentable object and a graphical user interface of the augmentable object;
  determining, by the computing device, a point cloud of an area comprising the receive area by receiving a set of images comprising the receive area, measuring a motion field based on the set of images, and determining the point cloud of the area based on the motion field;
  determining a relative orientation between the point cloud of the area and the point cloud of the augmentable object, determining an image according to the graphical user interface and the orientation; and
  determining, by the computer device, a sensory output based on the interaction profile and the point cloud of the area, and wherein the sensory output comprises a video.

5. The method according to claim 4, wherein the graphical user interface comprises at least one of a digital object, an anchor point in the point cloud of the augmentable object, or a user input for controlling the augmentable object, wherein the digital object comprises the sensory output associated with a component of the augmentable object, and wherein the component of the augmentable object is defined in terms of the anchor point, wherein the user input may be received relative to the component of the augmentable object, and wherein the user input may control the sensory output.

6. The method according to claim 4, wherein the wireless signal comprises at least one of an identifier of the augmentable object, a network path to obtain the interaction profile, or an orientation token, wherein the interaction profile comprises at least one of a digital object associated with the augmentable object, a user interface for controlling the augmentable object according to a user input, or a configuration parameter of the digital object, wherein the digital object is associated with the sensory output, and further comprising receiving the user input and determining the sensory output according to the user input, the graphical user interface, and the digital object.

7. An computer apparatus for augmenting reality, comprising:
  means to detect a wireless signal of an augmentable object with an antenna of the computer apparatus, wherein the antenna is coupled with an optical head-mounted display and is a narrow beam width directional antenna with a high gain for the wireless signal in a receive area, and wherein the receive area is equivalent to and aligned with a field of view of a wearer of the optical head-mounted display;
  means to receive a set of images comprising the receive area, measure a motion field based on the set of images, and determine a point cloud of an area comprising the receive area based on the motion field;
  means to obtain an interaction profile associated with the augmentable object using the wireless signal, wherein the interaction profile comprises a point cloud of the augmentable object and a graphical user interface of the augmentable object;
  means to determine a relative orientation between the point cloud of the area and the point cloud of the augmentable object;
  means to determine an image according to the graphical user interface and the orientation;
  means to determine a sensory output based on the interaction profile and the point cloud of an area; and
    means to output the sensory output, wherein the sensory output comprises a video.

8. The apparatus according to claim 7, wherein the graphical user interface comprises at least one of a digital object, an anchor point in the point cloud of the augmentable object, or a user input for controlling the augmentable object, wherein the digital object comprises the sensory output associated with a component of the augmentable object, and wherein the component of the augmentable object is defined in terms of the anchor point, and further comprising means to receive the user input relative to the component of the augmentable object, and means to control the sensory output via the user input.

9. The apparatus according to claim 7, wherein the wireless signal comprises at least one of an identifier of the augmentable object, a network path to obtain the interaction profile, or an orientation token, wherein the interaction profile comprises at least one of a digital object associated with the augmentable object, a user interface for controlling the augmentable object according to a user input, or a configuration parameter of the digital object, wherein the digital object is associated with the sensory output, and further comprising means to receive the user input and determine the sensory output according to the user input, the graphical user interface, and the digital object.

10. One or more non-transitory computer-readable media comprising instructions, wherein execution of the instructions by one or more processors of a computer device is to cause the computer device to:
  detect, by the computer device, a wireless signal of an augmentable object with an antenna of the computer device, wherein the antenna is in an optical head-mounted display and is a narrow beam width directional antenna with a high gain for the wireless signal in a receive area, and the receive area is equivalent to and aligned with a field of view of a wearer of the optical head-mounted display;

obtain, by the computer device, an interaction profile associated with the augmentable object using the wireless signal, wherein the interaction profile comprises a point cloud of the augmentable object and a graphical user interface of the augmentable object;

receive, by the computer device, a set of images comprising the receive area, measure a motion field based on the set of images, and determine a point cloud of an area comprising the receive area based on the motion field;

determine, by the computer device, a relative orientation between the point cloud of the area and the point cloud of the augmentable object and determine an image according to the graphical user interface and the orientation;

determine, by the computer device, a sensory output based on the interaction profile and the point cloud of the area; and output, by the computer device, the sensory output as a video.

11. The non-transitory computer-readable media according to claim 10, wherein the graphical user interface comprises at least one of a digital object, an anchor point in the point cloud of the augmentable object, or a user input for controlling the augmentable object, wherein the digital object comprises the sensory output associated with a component of the augmentable object, and wherein the component of the augmentable object is defined in terms of the anchor point, and further comprising receive the user input in relation to the component of the augmentable object, and control the sensory output according to the user input.

12. The non-transitory computer-readable media according to claim 10, wherein the wireless signal comprises at least one of an identifier of the augmentable object, a network path to obtain the interaction profile, or an orientation token, wherein the interaction profile comprises at least one of a digital object associated with the augmentable object, a user interface for controlling the augmentable object according to a user input, or a configuration parameter of the digital object, wherein the digital object is associated with the sensory output, and further comprising receive the user input and determine the sensory output according to the user input, the graphical user interface, and the digital object.

* * * * *